INVENTOR.
ANDREW ALFORD
BY
Ezekiel Wolf, Wolf+Greenfield
ATTORNEYS

United States Patent Office 3,162,807
Patented Dec. 22, 1964

3,162,807
HIGH FREQUENCY MEASURING SYSTEM INCLUDING AUTOMATIC OSCILLATOR AMPLITUDE CONTROL MEANS
Andrew Alford, Winchester, Mass.
(299 Atlantic Ave., Boston 9, Mass.)
Filed June 21, 1960, Ser. No. 37,728
8 Claims. (Cl. 324—58)

This invention relates in general to high frequency measurements and more particularly concerns measurement systems having microwave mixers for frequency conversion. A system including a microwave mixer and slotted line for measuring VSWR according to the invention provides an indication of VSWR with exceptionally high accuracy.

A typical VSWR measuring system comprises a test waveguide in the form of a slotted coaxial measuring line energized at one end by a source of microwave energy operating at a frequency $f_1$ and terminated at the other end with an unknown load. The measuring line is slidably fitted with a carriage. The carriage supports a probe which extends through the slot into the measuring line for sensing the electric field in the measuring line. A crystal mixer is mounted on the carriage and the energy coupled from the measuring line by the probe is delivered to one input of the crystal mixer. A waveguide, such as a flexible coaxial cable, couples a local oscillator operating at a frequency $f_2$ to the other input of the crystal mixer. The amplitude of the local oscillator signal is generally several times larger than the amplitude of the probe signal coupled to the crystal mixer. The mixer output is electrically connected by a flexible cable to an intermediate frequency amplifier and successively to a detector and indicator.

When the carriage is moved along the slotted measuring line, the flexible cable connecting the local oscillator to the crystal mixer is flexed. With a frequency $f_2$ above 1000 megacycles, it has been discovered that flexing this cable varies the local oscillator voltage transmitted through the cable. These variations cause corresponding shifts in the quiescent operating point on the static characteristic of the crystal mixer. The conversion gain or transconductance of the crystal mixer changes as the operating point on the static characteristic shifts. Consequently, the amplitude of the mixer intermediate frequency output signal is a function not only of the VSWR being measured, but also of the position of the flexible cable coupling local oscillator energy to the mixer. The signal amplitude indicated at the output of the signal amplifier is therefore not an accurate representation of the VSWR in the slotted line.

Accordingly, it is an important object of the present invention to provide a system for accurately measuring VSWR at microwave frequencies.

An object of the invention is to maintain the quiescent operating point of a heterodyne crystal mixer constant despite variations in the transmission characteristics of means connecting the local oscillator to the heterodyne mixer.

Another object of the invention is to maintain constant the voltage delivered by the local oscillator to the heterodyne mixer.

A further object of the invention is to extend the frequency range of a microwave measuring system using a heterodyne crystal mixer.

According to the invention, means responsive to a first component of the mixer output signal related to local oscillator signal amplitude at the mixer input maintain this amplitude substantially constant.

Other features, objects and advantages of the invention will be better understood from the following specification when read in connection with the accompanying drawings, in which.

Figure 1:
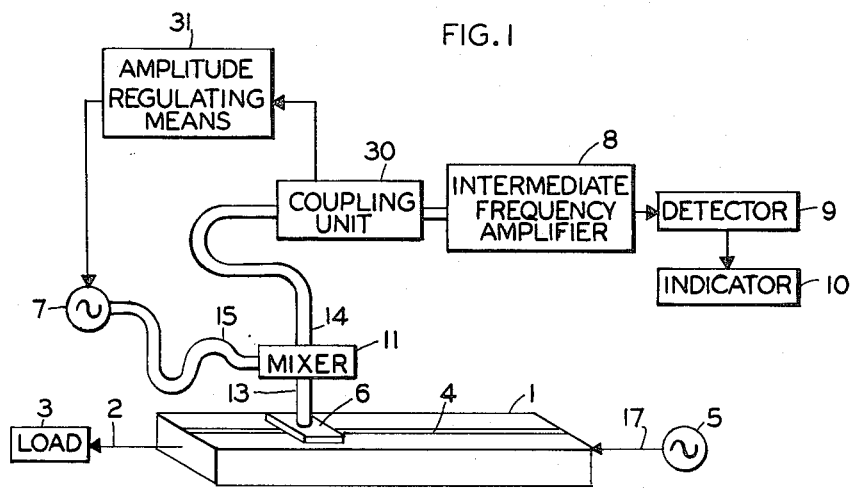
FIG. 1 shows an embodiment of the present invention in a microwave measuring system using a heterodyne mixer.

With reference to the drawing and more particularly FIG. 1 thereof, there is shown a block-pictorial diagram illustrating the logical arrangement of a system according to the invention. A microwave energy source 5 provides a signal of frequency $f_1$ to one end of slotted line 1. A load 3 is electrically connected by transmission means 2 to the other end of slotted measuring line 1. Slotted measuring line 1 supports a longitudinally slidable carriage 6 having a probe for withdrawing microwave energy from slotted measuring line 1. The probe extends through slot 4 to sense the field at a point inside the line without appreciably altering the line impedance. The voltage coupled from slotted measuring line 1 is electrically coupled through carriage 6 to crystal mixer 11 by transmission means 13. Local oscillator 7, operating at a frequency $f_2$, is electrically coupled to crystal mixer 11 through transmission means 15. The output signal from crystal mixer 11 is electrically connected by transmission means 14 and a coupling unit 30 having a rectifier to intermediate frequency amplifier 8. The output of I-F amplifier 8 is applied to detector 9. The detected signal from detector 9 is coupled to indicator 10 to provide an indication proportional to the field strength in slotted line 1 at the probe.

The radio frequency energy coupled from the space within slotted measuring line 1 by the probe supported on carriage 6 has a frequency $f_1$ and the amplitude is a function of the field strength at that point. This intelligence signal is mixed with the local oscillator signal in crystal mixer 11. The resultant output signal from crystal mixer 11 includes D.-C. and difference frequency components.

The coupling unit 30, which includes a rectifier, is electrically coupled between crystal mixer 11 and intermediate frequency amplifier 8. The output of this rectifier provides an error signal to regulating power supply 31 which delivers operating potentials to local oscillator 7. The rectifier may be a sufficiently high impedance so that it does not load down the crystal mixer 11 and interfere with the difference frequency signal applied to the input of intermediate frequency amplifier 8.

Regulating power supply 31 may be any well-known design capable of responding to an error signal appropriately controlling the potentials delivered to the local oscillator so as to maintain substantially constant the D.-C. signal component and the output of crystal mixer 11.

When the flexible wave transmission conduit 15 changes shape as the carriage 6 moves along the slotted line 1, the local oscillator signal amplitude at the input to crystal mixer 11 varies, causing a corresponding change in the amplitude of both the difference frequency signal component and the D.-C. component at the mixer output. It has been discovered that the magnitude of the D.-C. component is essentially determined by the amplitude of the local oscillator signal actually applied to the mixer input and nearly independent of the amplitude of the input signal being detected. By sensing the D.-C. signal component at the output and using this signal component to cause the local oscillator signal amplitude to increase and decrease as the cable is flexed, the local oscillator signal at the mixer input remains substantially constant. This constancy results in the signal amplitude applied to indicator 10 being a function almost entirely of the signal amplitude detected by the probe.

Figure 2:
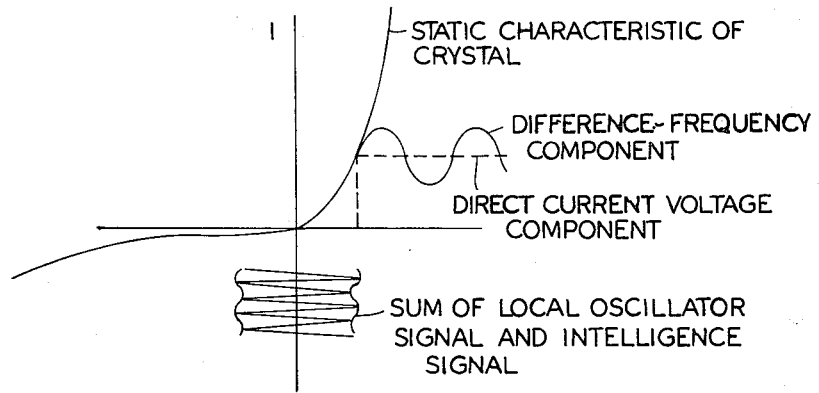
FIG. 2 is a representation of the static characteristics of a crystal diode used in a heterodyne mixer.

This will be better understood from examining FIG. 2 which shows a typical nonlinear diode characteristic with the sum of the local oscillator and detected input signal and the difference frequency output signal component both graphically represented. The conversion gain is related to the slope of the diode transfer characteristic about the D.-C. bias point. Since the local oscillator signal is much greater than the detected input signal, the D.-C. bias point is determined by the amplitude of the local oscillator signal applied to the diode. If the local oscillator signal amplitude varies, the D.-C. bias point shifts. Since the transfer characteristic is nonlinear, the conversion gain also changes because the slope at the new bias point is different, changing the amplitude of the difference frequency output signal.

If the local oscillator signal applied to the diode remains constant, the conversion gain remains substantially constant and the amplitude of the difference frequency output signal is proportional to the detected signal input and consequently is proportional to the field strength at the probe in the slotted line.

Figure 3:
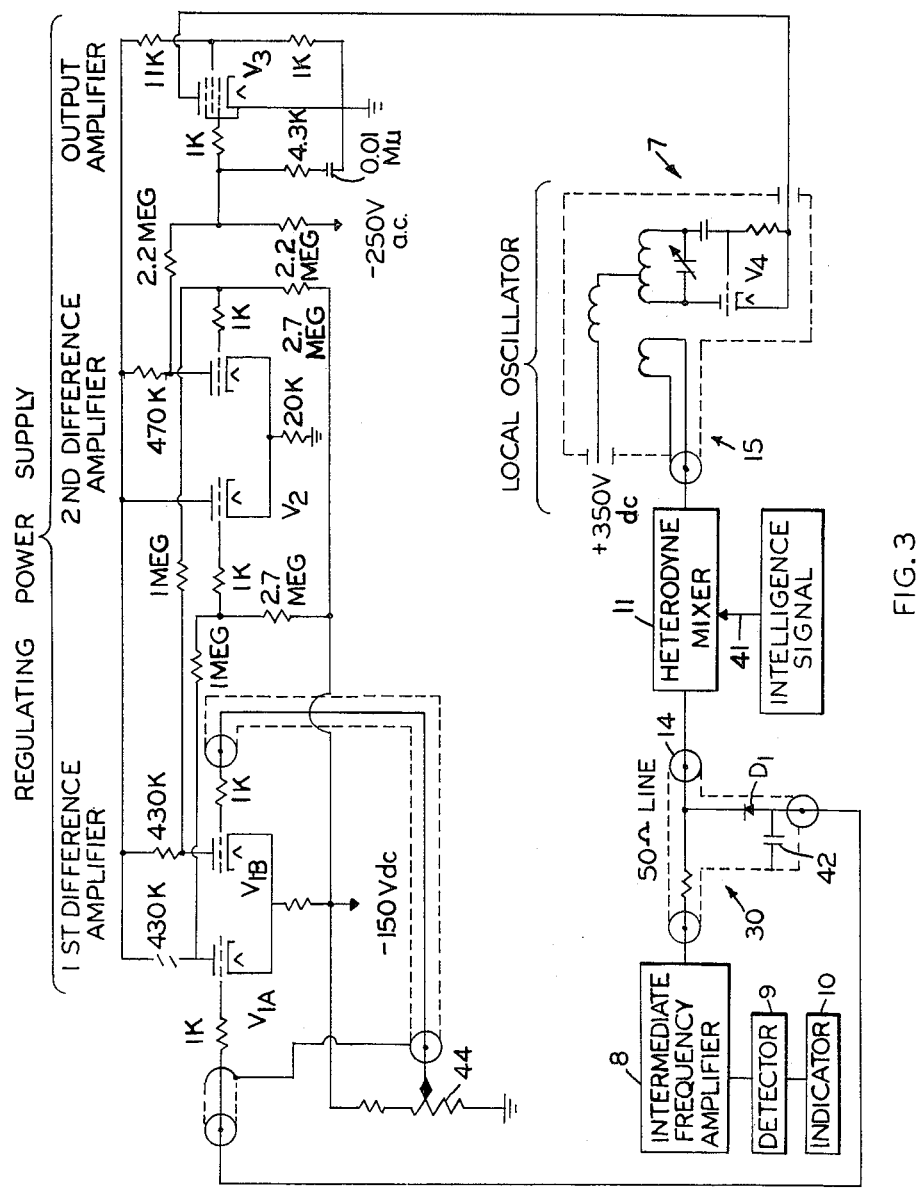
FIG. 3 is a combined schematic circuit-block diagram of an exemplary embodiment of the invention.

Referring to FIG. 3, there is shown a combined block-schematic circuit diagram of a preferred embodiment of the invention with some representative parameter values set forth. Since the amplifier and oscillator circuits themselves are conventional, only a brief description of the circuit appears. The crystal heterodyne mixer 11 receives the local oscillator signal from coaxial line 15 and the input signal from the probe at input 41. The output of mixer 11 is transmitted over line 14 through the rectifying coupling unit 30 to the input of intermediate frequency amplifier 8. The rectifier comprises a diode $D_1$ and a capacitor 42 to bypass R-F components to ground, the cathode resistance 43 common to tubes V1A and V1B functioning essentially as the rectifier resistance. A D.-C. potential is developed on the grid of tube V1A. This potential is effectively compared with the potential selected by the arm of potentiometer 44 applied to the grid V1B, twin-triode V1 functioning as a first difference amplifier.

Tube V2 and associated components function as a second difference amplifier to amplify the difference signal developed between the plates of tubes V1A and V1B to provide a control potential which is direct-coupled to the grid of pentode tube V3.

The plate of tube V3 is in series with oscillator tube V4. Tube V3 functions as a current regulator which controls the D.-C. current drawn by tube V4. The local oscillator signal amplitude is a function of the plate current of tube V4 and increases with increasing plate current. If the D.-C. signal provided by rectifier 30 increases, indicating that the local oscillator signal amplitude at the input to mixer 11 has increased, the potential on the grid of tube V3 becomes more negtaive, causing its plate current to decrease. The plate current of tube V4 decreases correspondingly and the local oscillator signal amplitude delivered to the input of coaxial line 15 decreases to effect a corresponding decrease in the amplitude of the local oscillator signal delivered to the local oscillator input of mixer 11, thereby effecting a reduction in the D.-C. component sensed by rectifier 30. A reduction in the latter potential effects a similar corrective action to cause an increase in the local oscillator signal amplitude. As a result, the cable coupling the local oscillator signal to the input mixer may be flexed as the carriage translates along the slotted line without interfering with the accuracy of the measurements being conducted.

There has been described the discovery of the reason for inaccuracies in high frequency measurements and an exemplary embodiment of apparatus for solving the problem. It is apparent that those skilled in the art may make numerous modifications of and departures from the specific apparatus described herein without departing from the inventive concepts. Consequently, the invention is to be construed as limited only by the spirit and scope of the appended claims.

What is claimed is:

1. Electrical measuring apparatus comprising, a source of a first high frequency signal, a source of a second high frequency signal of smaller amplitude than said first signal, a mixer relatively movable with respect to said first signal source and having first and second inputs for combining said first signal applied to said first input with said second signal applied to said second input to provide an output signal having at least a D.-C. component representative of the magnitude of said first high frequency signal at said first input and a difference frequency component representative of the magnitude of said second signal at said second input, means including a waveguide having transmission characteristics subject to change in response to relative movement between said mixer and said first signal source for coupling said first signal to said mixer, means for coupling said second signal to said mixer, and means responsive to said D.-C. component for maintaining the amplitude of said first signal substantially constant at the input to said mixer despite changes in said transmission characteristics and for maintaining the magnitude of said difference frequency component accurately representative of the magnitude of said second signal at said second input.

2. Electrical measuring apparatus in accordance with claim 1 wherein said second signal source comprises an electromagnetic field sensitive probe close to said mixer, and said waveguide comprises a flexible conduit to permit relative movement between the combination of said probe and mixer and said first signal source.

3. Electrical measuring apparatus in accordance with claim 1 and further comprising, means responsive to said difference frequency component for providing an indication of the amplitude of said second signal.

4. Electrical measuring apparatus in accordance with claim 2 and further comprising, means responsive to said difference frequency component for providing an indication of the field strength sensed by said probe.

5. Electrical measuring apparatus in accordance with claim 4 and further comprising, a test waveguide, means for applying energy of said second signal frequency to said test waveguide, and means for supporting said combination with respect to said test waveguide to permit said probe to sense the field therein at different positions along the length thereof.

6. Electrical measuring apparatus in accordance with claim 5 wherein said mixer comprises a diode having a nonlinear transfer characteristic, said first source comprises an oscillator having an electron tube whose plate current is proportional to said first signal amplitude, and said D.-C. component responsive means comprises, a source of a reference potential, a differential amplifier responsive to the difference between said D.-C. component and said reference potential for providing a control signal, and means responsive to said control signal for regulating said plate current.

7. In a high frequency measuring system for providing an indication of the field strength at a number of points differently spaced with respect to a source of a local oscillator signal having an assembly including a probe coupled to a closely adjacent crystal mixer with a flexible waveguide coupling said local oscillator signal from said source to an input of said mixer whereby said mixer provides an output signal having a D.-C. component representative of said local oscillator signal amplitude and an A.-C. component representative of the field strength at said probe, said system having indicating means responsive to said second component, the improvement of means responsive to said D.-C. component for maintaining the local oscillator signal substantially constant at said mixer input and for maintaining said A.-C. component accurately representative of the field strength of said probe.

8. The improvement of claim 7 wherein said first component is a rectified D.-C. component and said second component is a difference frequency component much lower in frequency than said local oscillator signal and the signal producing the field strength at said probe.

References Cited in the file of this patent
UNITED STATES PATENTS

| | | |
|---|---|---|
| 2,411,553 | Ramo | Nov. 26, 1946 |
| 2,451,320 | Clammer et al. | Oct. 12, 1948 |
| 2,504,754 | Sweeny | Apr. 18, 1950 |
| 2,681,434 | Wheeler | June 15, 1954 |
| 2,733,340 | Garner et al. | Jan. 31, 1956 |
| 2,760,155 | Kelly | Aug. 21, 1956 |
| 2,786,180 | Cohn | Mar. 19, 1957 |
| 2,832,040 | Harmon | Apr. 22, 1958 |
| 2,931,900 | Goodman | Apr. 5, 1960 |

FOREIGN PATENTS

| | | |
|---|---|---|
| 416,501 | Great Britain | Sept. 17, 1934 |

OTHER REFERENCES

V.H.F. Impedance Measurements, article in Electronics, June 1945, pages 97–101.

Technique of Microwave Measurements textbook, by Carl G. Montgomery, M.I.T. Radiation Lab. Series, published by McGraw-Hill, copyright 1947.

The -hp- Program for Waveguide Type Measurement," article in Hewlett-Packard Co., Palo Alto, Calif., volume 2, M.6, February 1951.

Low Noise Cables, article by C. Camillo, Amphenol Eng. News, Jan.–Feb. 1954, volume 7, No. 1, page 238.